April 1, 1969     E. MAX ET AL     3,436,677
MAGNETO-OPTIC RADIATION CONTROL AND MODULATOR
Filed June 29, 1964
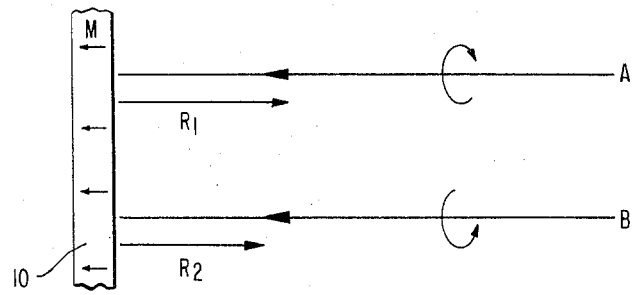
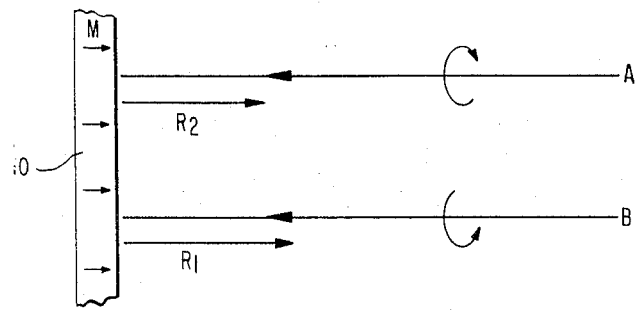
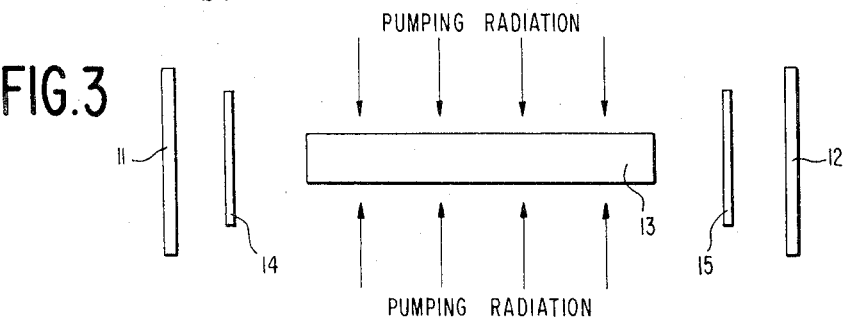
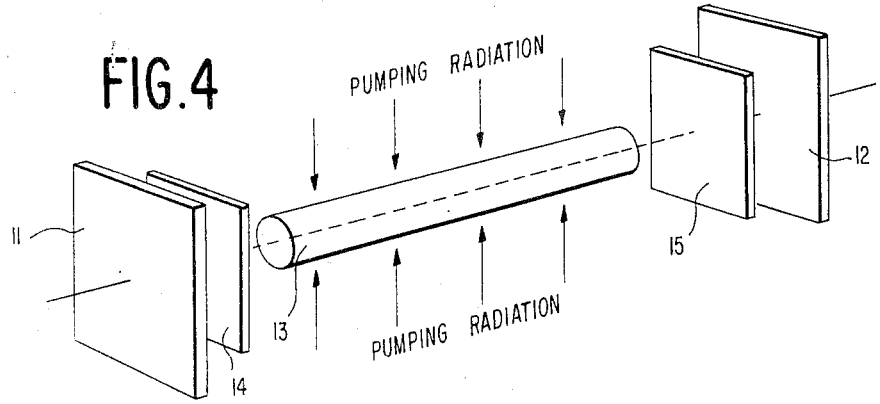
INVENTORS
ERHARD MAX
WERNER W. KULCKE
KURT M. KOSANKE
BY Sughrue, Rothwell, Mion, Zinn & Macpeak
ATTORNEYS

United States Patent Office 3,436,677
Patented Apr. 1, 1969

3,436,677
MAGNETO-OPTIC RADIATION CONTROL
AND MODULATOR
Erhard Max, Werner W. Kulcke, and Kurt M. Kosanke, Wappingers Falls, N.Y., assignors to International Business Machines Corporation, New York, N.Y., a corporation of New York
Filed June 29, 1964, Ser. No. 378,683
Int. Cl. H01s 3/10, 3/09; G02f 1/22
U.S. Cl. 331—94.5                           5 Claims

ABSTRACT OF THE DISCLOSURE

In a laser type device, magnetic reflectors are used to build up resonance. The radiation emitted in response to pumping radiation medium is non-linearly polarized, either naturally or by optical devices, and reflects off the magnetic reflector an amount dependent upon direction of magnetization of the reflector. By changing the direction of the magnetization vector, the radiation output can be suppressed, thereby resulting in radiation modulation.

---

This invention relates to a magneto-optic radiation control and modulator, and more particularly to a magneto-optic control suitable for modulating or switching a laser.

Among the practical applications being developed for the laser devices which have heretofore been primarily laboratory equipment are various systems of optical logic which require control and modulation of the emission of radiation. Of the systems proposed, the primary approach employed is the variable rotation of polarization planes or fields, so as to control the polarization of the emitted radiation.

The present invention proposes controlling the polarization of radiation by magnetically varying the reflectivity of the reflective surfaces defining a laser cavity.

Accordingly, it is an object of this invention to control and modulate the polarization of radiation.

A further object of this invention is to control and modulate radiation by magnetically varying the reflectivity of reflective surfaces.

Other objects and advantages of the invention will be pointed out in the following description and claims and illustrated in the accompanying drawing, which discloses, by way of example, the principles of the invention and the best mode which has been contemplated of applying these principles.

FIGURE 1 is a schematic representation of the reflectivity effects of a magnetic mirror, in a first condition;

FIGURE 2 is a schematic representation of a magnetic mirror, in a second condition;

FIGURE 3 is a somewhat schematic side view of a laser embodying the magneto-optic control and modulator of this invention; and FIGURE 4 is a somewhat schematic perspective view of the laser structure of FIGURE 3.

For the purposes of this discussion, a laser medium is capable of emitting radiation when subjected to pumping radiation from a suitable source. A "laser" is a device employing a "negative temperature" medium, that is a pumped laser medium to produce radiation, placed into a "cavity" that comprises at least two reflective surfaces necessary to obtain the desired resonance properties for stimulated emission of radiation.

This invention utilizes and incorporates a particular magneto-optic effect, which is schematically illustrated in FIGURES 1 and 2. In those figures, a mirror 10 of a suitable magnetic material is shown as having circularly polarized rays A and B impinging upon the polished mirror surface. As indicated by the arrows, ray A is right-hand circular polarized while ray B is left-hand circular polarized. The magnetic mirror 10 has a field applied to it so as to have magnetization vectors M, as illustrated schematically, perpendicular to the planar reflective surface. The reflectivities of the rays A and B from the plane surface of the magnetized mirror 10 vary, and are indicated as rays $R_1$ and $R_2$, with $R_1$ representing the greater reflectivity. As schematically illustrated in FIGURE 2, when the direction of the magnetization vectors M within the magnetic mirror 10 is reversed, the reflectivity effect for the rays A and B is reversed. That is, in FIGURE 1 where the magnetization vector is leftward, ray A has the greater reflectivity $R_1$. In FIGURE 2, where the magnetization vector M is directed rightward, ray B has the greater reflectivity $R_1$.

This variation in reflectivity is applied in the laser of FIGURE 3. The laser cavity is defined by two magnetic mirrors 11, 12 similar to the magnetic mirror 10 of the schematic illustrations of FIGURES 1 and 2. Any suitable laser medium 13, operable as an emitting medium, is positioned in the cavity to be pumped by suitable pumping radiation, as schematically represented by the arrows. The pumping radiation is derived from any suitable pumping radiation source, as now well known in the art. Some laser media, as dysprosium doped calcium fluoride, subjected to a magnetic field radiate circular polarized light. Otherwise, in order to obtain circularly polarized light to impinge on the magnetic mirrors 11, 12, polarization elements such as quarter wave plates 14, 15 are positioned within the cavity between the negative temperature medium 13 and the magnetic mirrors 11, 12. Output from the laser cavity is obtained by making one of the magnetic mirrors semi-transparent to the stimulated radiation from the negative temperature medium 13.

In order to provide the desired control and modulation of radiation emitted from the negative temperature medium 13, the material of the magnetic mirrors 11, 12 and the intensity of the magnetization vectors M within the mirrors are selected so that the threshold condition required for laser activity will occur only when the total reflectivity between the two mirrors is $R_1R_1$. Any other combination of reflectivities, such as $R_1R_2$ or $R_2R_2$, will result in an optical Q of the cavity too low to satisfy the threshold condition. The control and modulation of the stimulated radiation is dependent upon the combination or selection of these reflectivities. Thus, where both magnetic mirrors 11, 12 have magnetization vectors M directed away from the interior of the cavity, both mirrors will present a reflectivity $R_1R_1$ to a righthand circular polarized ray, such as ray A of FIGURE 1. Lasing action is permitted and a right-hand circular polarized ray will be delivered through the semi-transparent mirror as an output ray. Reversing the magnetization vectors of the two magnetic mirrors 11, 12 so that the vectors are directed inwardly of the cavity, in similarity to the schematic showing of FIGURE 2, will give a reflectivity $R_1R_1$ to a left-hand polarized ray, such as ray B of FIGURE 2. Thus, lasing action is permitted and a left-hand polarized ray will be provided as an output.

In the first instance, in which a right-hand polarized ray has the greater reflectivity $R_1R_1$, the lesser reflectivity $R_2R_2$ of the left-hand circular polarized ray has an optical Q too low to reach the threshold required for lasing activity or is suppressed. A similar result will be obtained where the left-hand circular polarized ray is favored with the greater reflectivity $R_1$, and the right-hand circular polarized ray is suppressed.

In order to provide a control over lasing activity, it is possible to provide magnetization vectors in the two magnetic mirrors 11, 12 which are directed similarly.

That is, the magnetization vector mirror 11 might be directed leftward and the magnetization vector of mirror 12 similarly directed leftward. In this circumstance, a right-hand circular polarized ray, such as ray A, would obtain the greater reflectivity $R_1$ at the first magnetic mirror 11, while a left-hand circular polarized ray, such as ray B, would obtain the greater reflectivity $R_1$ at the right-hand mirror 12. Thus, the required threshold energy level would not be reached, no lasing activity would occur, and the laser would be switched off.

Due to a high gain in the laser, however, it could happen that the optical Q's for any combination of reflectivities as $R_1R_1$ or $R_1R_2$ or $R_2R_2$ are high enough to satisfy the lasing condition. That means that lasing modes referring to these reflectivities are all above threshold. As before, it will hold $R_1R_1 > R_1R_2 > R_2R_2$ and the laser will lase in a mode belonging to the highest optical Q. That is, the mode having the cavity reflectivity $R_1R_1$. The other modes become suppressed and all energy will be found in the strongest mode. Therefore, the laser cannot be turned off by switching to the cavity reflectivity $R_1R_2$. The laser will lase in a mode referring to the cavity reflectivity $R_1R_1$, thus giving a right-hand or a left-hand circular polarized light output, depending on the direction of magnetization in the cavity mirrors as explained above.

In a modification of the laser of FIGURE 3, one mirror, such as right end mirror 12, is formed of a dielectric material having a constant reflectivity R for rays of either right-hand or left-hand circular polarization. Where this is done, the selection of the greater reflectivity $R_1$ at the magnetized mirror 11 for rays of right-handed or left-handed circular polarization would determine only which type of ray appeared as an output. As the reduction of total reflectivity below the level $R_1R$ could not be obtained, and this level is required for the threshold energy level for lasing activity, the laser could not be switched off, but merely modulated between outputs of differing circular polarizations.

In constructing a magneto-optic control and modulator of the optical Q of the laser cavity in accordance with this invention, the materials selected for use as magnetic mirrors 11, 12 depend at least in part on the frequency band chosen for operation and the degree of modification of reflectivities available. Suitable materials are found among the alloys of nickel and iron and among ferrite materials having hexagonal structures. Depending upon the material used, it may not be necessary that the magnetization vectors be strictly perpendicular to the plane surface of the magnetic mirrors, and the vectors may have only a strong component perpendicular to the mirror surface.

While there have been shown and described and pointed out the fundamental novel features of the invention as applied to the preferred embodiment, it will be understood that various omissions and substitutions and changes in the form and details of the device illustrated and in its operation may be made by those skilled in the are without departing from the spirit of the invention. It is the intention, therefore, to be limited only as indicated by the scope of the following claims.

What is claimed is:
1. A radiation control and modulator comprising a medium responsive to radiation from a pumping radiation source for generating non-linearly polarized radiation, a pumping radiation source, a pair of reflective surfaces, at least one of which is partially transparent, positioned with respect to said medium to form a cavity of the type which builds up the intensity of radiation produced by said medium by reinforcement of the radiation due to reflection, at least one of said reflectors being a magnetically variable reflector having a controllable magnetic vector whereby the direction of said magnetic vector controls the reinforcement conditions of said non-linearly polarized radiation.

2. A radiation control and modulator comprising a lasing medium responsive to radiation from a pumping radiation source for generating output radiation, a pumping radiation source, a pair of reflective surfaces defining a cavity for said medium, non-linear polarizing means positioned between said medium and said reflective surfaces for non-linearly polarizing said output radiation, at least one of said reflectors being a magnetically variable reflector having a controllable magnetic vector whereby the direction of said magnetic vector controls the reinforcement conditions of said non-linearly polarized radiation.

3. A radiation control and modulator as in claim 2, in which
the reflectivity of said at least one reflective surface is controlled by the direction of a magnetization vector having at least a major component perpendicular to said reflective surface.

4. A radiation control and modulator comprising:
a laser medium,
a pumping radiation source,
reflective surfaces defining a cavity for the laser medium,
means for magnetically varying the reflectivity of the reflective surfaces, and
means positioned between said emitting medium and said reflective surfaces to polarize the stimulated radiation.

5. A radiation control and modulator as claimed in claim 4 whereby the reflectivity of said reflective surfaces is controlled by the direction of a magnetization vector having at least a major component perpendicular to said reflective surface.

References Cited
UNITED STATES PATENTS

| | | | |
|---|---|---|---|
| 3,141,920 | 7/1964 | Bebb et al. | 350—151 |
| 3,142,720 | 7/1964 | Adams. | |
| 3,155,944 | 11/1964 | Oberg et al. | |
| 3,292,103 | 12/1966 | Soules et al. | 331—94.5 |

OTHER REFERENCES

McClung et al., $R_2$ Line Optical Maser Action in Ruby, Jour. of App. Phys., vol. 33, #10, October 1962, pp. 3139, 3140.

JEWELL D. PEDERSEN, *Primary Examiner.*

E. BAUER, *Assistant Examiner.*

U.S. Cl. X.R.

350—151, 157